United States Patent
Johnson et al.

[11] 3,732,453
[45] May 8, 1973

[54] WIDE ANGLE ULTRAVIOLET RADIATION DETECTOR

[75] Inventors: Robert G. Johnson, Minnetonka; Benjamin T. McClure, Hopkins, both of Minn.

[73] Assignee: Honeywell Inc., Minneapolis, Minn.

[22] Filed: Nov. 24, 1971

[21] Appl. No.: 201,672

[52] U.S. Cl.............313/100, 250/83.3 UV, 313/101, 313/185, 313/214, 313/216, 313/224
[51] Int. Cl...............................................H01j 39/04
[58] Field of Search........................313/93, 100, 101, 313/214, 185, 224, 216; 250/83.6 R, 83.3 UV, 43.5 R

[56] References Cited

UNITED STATES PATENTS

| 1,917,854 | 7/1933 | Rentschler | 313/101 |
| 3,255,354 | 6/1966 | Cade | 313/93 X |
| 3,394,280 | 7/1968 | Trumble | 313/214 X |

*Primary Examiner*—Palmer C. Demeo
*Attorney*—Lamont B. Koontz et al.

[57] ABSTRACT

An ultraviolet sensitive gaseous discharge detector has uniform sensitivity over a broad viewing angle. The cathode of the detector has an essentially circular cross-section while the anode has an elongated cross-section. The anode is aligned in a common plane with the cathode with the elongated surfaces of the anode being aligned essentially parallel to the common plane of the electrodes.

10 Claims, 5 Drawing Figures

PATENTED MAY 8 1973

3,732,453

INVENTOR.
ROBERT G. JOHNSON
BENJAMIN T. McCLURE
BY
ATTORNEY.

WIDE ANGLE ULTRAVIOLET RADIATION DETECTOR

REFERENCE TO RELATED PATENT APPLICATIONS

Reference should be made to co-pending patent application Ser. No. 201,662 by Roger E. Axmark and Clifford W. Erickson which was filed on an even date herewith and which is assigned to the same assignee as the present invention.

BACKGROUND OF THE INVENTION

This invention is related to radiation sensitive, gaseous discharge detectors of the Geiger-Mueller type. More particularly, it is concerned with a low cost ultraviolet sensitive detector having structurally rigid electrodes and uniform sensitivity to ultraviolet radiation over a broad viewing angle.

What is meant by "Geiger-Mueller detector" is a radiation detector having an anode and a cathode disposed in an ionizable gas, and which, upon being subjected to radiation to which it is sensitive, causes an electron to be present within the electric field established by the anode and cathode, whereupon the electron accelerates toward the anode, ionizing the gas, and causing a glow discharge current to flow, which current must be subsequently quenched by means of a quenching mechanism.

One particularly useful ultraviolet sensor is described in U.S. Pat. No. 3,488,492 to R. J. Niksarian which is assigned to the same assignee as the present invention. In this detector a pair of relatively straight wire-type electrodes are positioned in a gas filled envelope. This detector exhibits a non-uniform angular sensitivity to ultraviolet radiation. Maximum sensitivity is exhibited at 45° from the plane of the two electrodes. Minimum sensitivity occurs in the plane of the two electrodes. This minimum sensitivity, or "zero angle blind spot," is due to the shadowing effect of the anode which blocks radiation from striking the surface of the cathode.

While the directional sensitivity described above is highly advantageous in some radiation sensing systems, there are applications in which an ultraviolet sensor having uniform sensitivity over a broad viewing angle is desirable. For instance, fire detection systems requiring broad area surveillance often utilize several sensors to achieve uniform angular sensitivity. It is highly advantageous to utilize a single sensor rather than several sensors.

SUMMARY OF THE INVENTION

The radiation detector of the present invention comprises an anode and a cathode aligned in a common plane within an envelope. A gaseous filling is contained in the envelope. The cathode has an essentially circular cross-section while the anode has an elongated cross-section. The elongated surfaces of the anode are aligned essentially parallel to the common plane.

The radiation detector of the present invention exhibits relatively uniform sensitivity over a broad viewing angle while retaining the electrode ruggedness and low cost of the prior art radiation detector having two closely spaced cylindrical electrodes.

DESCRIPTION OF THE PREFERRED EMBODIMENTS

Figure 1:
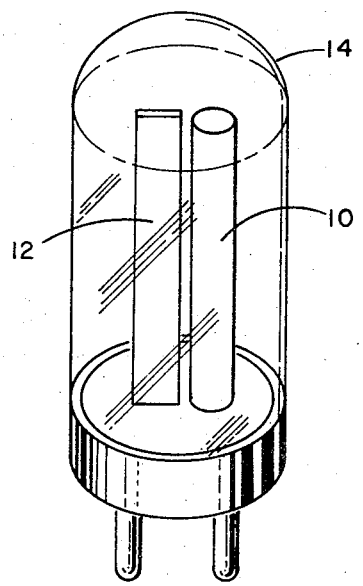
FIG. 1 shows the radiation detector of the present invention.

FIG. 1 shows the radiation detector of the present invention, which will hereafter be referred to as the "knife-edge anode detector." Cathode 10 and anode 12 are aligned in a common plane. Cathode 10 has an essentially circular cross-section, while anode 12 has an elongated cross-section. The elongated surfaces of anode 12 are aligned essentially parallel to the common plane. Envelope 14 encloses cathode 10 and anode 12. Contained within envelope 14 is a gaseous filling which may be, for example, a hydrogen-helium or a hydrogen-neon gas mixture.

Figure 2:
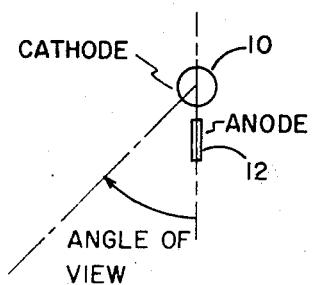
FIG. 2 shows a top view of the cathode and anode of the radiation detector of the present invention.

FIG. 2 shows a top view of cathode 10 and anode 12 and illustrates the alignment of the two electrodes in a common plane. In the preferred embodiment, the cross-sectional width of anode 12 is less than about 30 percent of the cross-sectional diameter of cathode 10.

Particularly successful knife-edge anode detectors have been fabricated in which the cathode diameter is between about 0.015 inches and 0.100 inches. As described above, the preferred cross-sectional width of anode 12 is less than an about 30 percent of the diameter of cathode 10. Molybdenum, nickel, and tungsten are three desirable anode and cathode materials. However, the invention is not limited to these materials. The spacing between cathode 10 and anode 12 is between about 0.004 inches and about 0.012 inches, with the desired operating voltage influencing the particular spacing chosen. When a hydrogen-neon gas mixture comprises the gaseous filling in the detector, the preferred gas composition is between about 7 percent hydrogen to about 25 percent hydrogen, with the balance being neon. The gas pressure is preferably between about 100 torr and about 600 torr. As will be described later, the particular gas composition and pressure selected will be influenced by the desired operating voltage of the detector.

Figure 3:
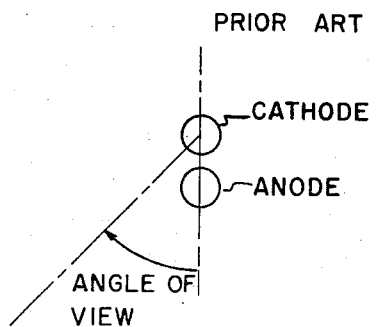
FIG. 3 shows a top view of the cathode and anode of a prior art detector.

It can be seen that anode 12 allows much more radiation to hit cathode 10 from the anode direction than the prior art radiation detector shown in FIG. 3. While a reduction in the shadow effect of the anode could be achieved by merely reducing the size of the anode in FIG. 3, such a reduction severely reduces rigidity against vibration in the common plane. The danger of shorting between the anode and cathode is significantly increased. On the other hand, in the knife-edge anode detector the only direction in which appreciably more vibration can occur is the direction perpendicular to the common plane. This does not produce any decrease of spacing between cathode 10 and anode 12, not does it produce shorting of the electrodes. In fact, the deflection in the direction perpendicular to the common plane may be less than in the prior art electrode configuration of FIG. 3 since there is less mass at the end of anode 12.

To evaluate the improvement in angular sensitivity with the present invention, several detectors utilizing the prior art configuration were compared to the knife-edge anode detectors. The prior art detectors comprised an anode and a cathode of circular cross-section which were formed from tungsten. The diameter of each electrode was 0.030 inches and the separation between the electrodes was 0.006 inches. A hydrogen-neon gas mixture comprised the gaseous filling within the envelope.

The knife-edge anode detectors comprise a tungsten cathode of 0.030 inches diameter and a molybdenum anode having a cross-sectional length of 0.030 inches and a cross-sectional width of 0.006 inches. The separation between the cathode and the anode was 0.006 inches. As in the prior art detectors, a hydrogen and neon gas mixture comprised the gaseous filling.

Figure 4:
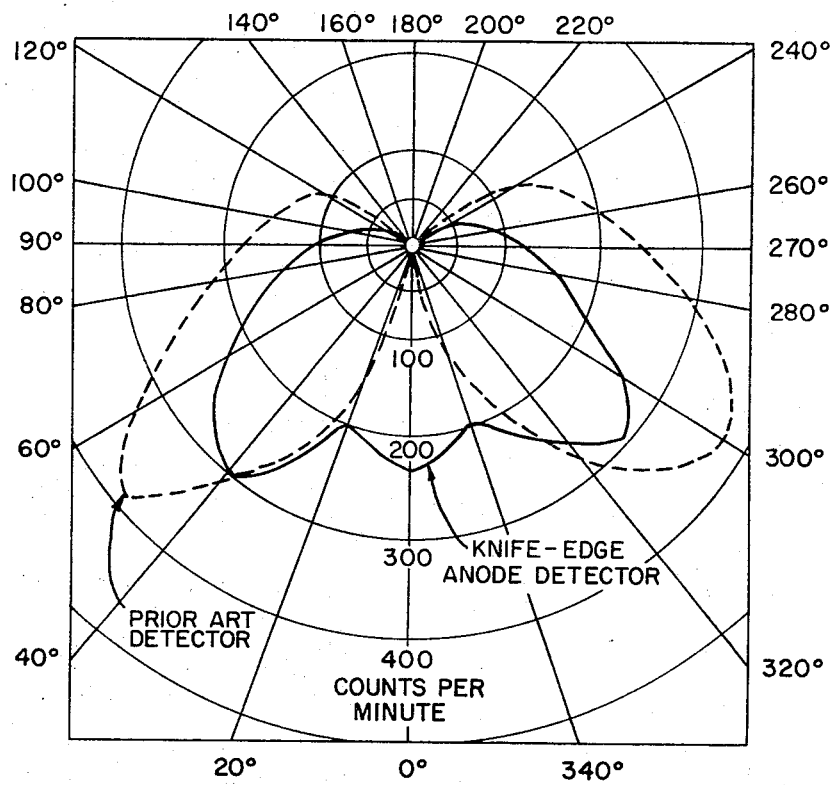
FIG. 4 shows a comparison of the angular sensitivity of the prior art detector with the angular sensitivity of the detector of the present invention.

The angular sensitivity of the detectors to a natural gas flame positioned at 38 inches from the detector and having a gas flow of 138 cc per minute was measured. As shown in FIG. 4, the angular sensitivity of the knife-edge anode detector is modified with respect to the prior art in the following manner. When similar gas composition, gas pressure, cathode size and composition, and the same nominal operating voltage are used, it is found that for angles of view greater than 35° the sensitivity of the knife-edge anode detector is reduced from that of the prior art detector. This reduction is due to the longer electric field line paths from anode to cathode which are the result of the reduction of the circular anode cross-section to a thin, essentially rectangular cross-section. This causes less electric field intensity and a higher voltage requirement for local breakdown. Therefore the average ionization efficiency is lower in the knife-edge anode detector.

For angles less than about 35°, the negative effect on the sensitivity of the knife-edge anode detector caused by the reduced average ionization efficiency is exceeded by the effect of the modified anode cross-section, which permits a large amount of additional ultraviolet radiation to strike the cathode. Therefore, the small angle of view sensitivity of the knife-edge anode detector greatly exceeds that of the prior art detector, completely eliminating the zero angle blind spot.

Figure 5:
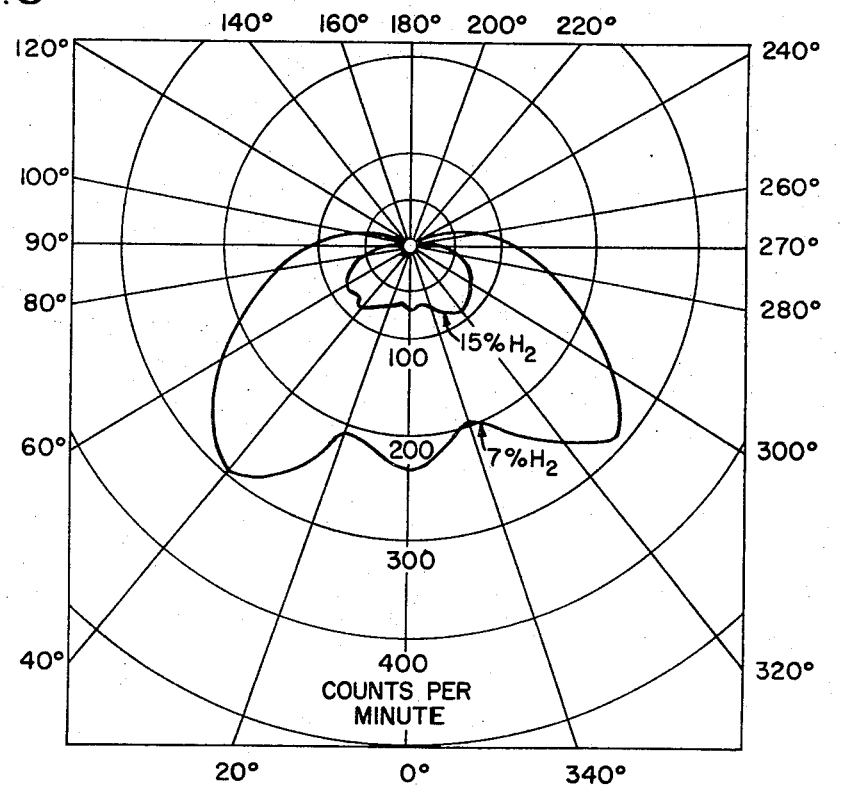
FIG. 5 shows a comparison of the angular sensitivity of two detectors of the present invention having different gaseous filling pressures.

The overall sensitivity of the knife-edge anode detector for a given operating voltage may be increased in several ways. First, a decrease in the hydrogen concentration of the gaseous filling causes an increase in sensitivity. FIG. 5 shows the angular sensitivity of two knife-edge anode detectors having identical electrode configurations but different gaseous fillings. One detector was filled with a gaseous filling of 15 percent hydrogen and 85 percent neon while the other detector was filled with 7 percent hydrogen and 93 percent neon. In both cases, the gas pressure was 300 torr. It can be seen that the reduction of hydrogen percent from 15 percent to 7 percent caused a substantial increase in sensitivity.

Second, the gas pressure of the gaseous filling may be reduced, thereby achieving the same result as a reduction in hydrogen concentration. It should be noted, however, that too great a decrease in either gas pressure or hydrogen concentration will cause the detector to lose its ability to quench efficiently after each discharge, and a high rate of spurious discharges or "false counts" will occur.

It is to be understood that this invention has been disclosed with reference to a series of preferred embodiments and it is possible to make changes in form and detail without departing from the spirit and scope of the invention.

The embodiments of the invention in which an exclusive property or right is claimed are defined as follows:

1. An ultraviolet radiation detector comprising:
   a sealed envelope having a transparent portion,
   an ionizable gaseous filling contained within the envelope,
   a cathode of essentially circular cross-section positioned within the envelope, the cathode having an apparatus cross-sectional diameter, and
   an anode of elongated cross-section aligned within the envelope in a common plane with the cathode, the anode having a cross-sectional length essentially parallel with the common plane and essentially perpendicular to the cathode and having a cross-sectional width essentially perpendicular to the common plane, the cross-sectional width being appreciably less than the apparent cross-sectional diameter of the cathode.

2. The radiation detector of claim 1 wherein the anode has a cross-sectional width which is less than about 30 percent of the cross-sectional diameter of the cathode.

3. The radiation detector of claim 1 wherein the cathode has a cross-sectional diameter of between about 0.015 inches and about 0.100 inches.

4. The radiation detector of claim 3 wherein the cathode and the anode are separated by between about 0.004 inches and about 0.012 inches.

5. The radiation detector of claim 1 wherein the cathode is composed of a metal of the group consisting of molybdenum, nickel, and tungsten.

6. The radiation detector of claim 1 wherein the anode is composed of a metal of the group consisting of molybdenum, nickel, and tungsten.

7. The radiation detector of claim 1 wherein the gaseous filling comprises a hydrogen and neon gas mixture.

8. The radiation detector of claim 7 wherein the hydrogen and neon gas mixture comprises about 7 percent to about 25 percent hydrogen, balance neon.

9. The radiation detector of claim 7 wherein the hydrogen and neon gas mixture has a pressure of between about 100 torr and about 600 torr.

10. The radiation detector of claim 1 wherein the gaseous filling comprises a hydrogen and helium gas mixture.

* * * * *